United States Patent
Hannesen et al.

(10) Patent No.: US 7,066,114 B1
(45) Date of Patent: Jun. 27, 2006

(54) REVERSE FAN OPERATION FOR VEHICLE COOLING SYSTEM

(75) Inventors: Uwe Hannesen, Wiesbaden (DE); Roberto Diesel, Niedernhausen (DE); Jan Meschkat, Katzenelnbogen (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/009,968

(22) Filed: Dec. 10, 2004

(51) Int. Cl.
*F01P 7/02* (2006.01)

(52) U.S. Cl. ............... 123/41.12; 123/41.1; 236/35
(58) Field of Classification Search ......... 123/41.12, 123/41.1; 236/35
See application file for complete search history.

(56) References Cited

U.S. PATENT DOCUMENTS

| | | | |
|---|---|---|---|
| 4,955,431 A * | 9/1990 | Saur et al. .......... | 165/271 |
| 6,076,488 A * | 6/2000 | Yamagishi .......... | 123/41.12 |
| 6,600,249 B1 * | 7/2003 | Nelson et al. ....... | 310/91 |
| 6,865,901 B1 * | 3/2005 | Horn et al. .......... | 62/238.6 |

* cited by examiner

Primary Examiner—Tony M. Argenbright
Assistant Examiner—Katrina Harris
(74) Attorney, Agent, or Firm—Cary W. Brooks

(57) ABSTRACT

A system for reducing the time that it takes a vehicle fuel cell engine to reach its operating temperature at vehicle start-up. The system includes a radiator and a fan, where a cooling fluid from the engine is directed through the radiator where it is cooled by airflow from the fan during high load conditions. The radiator also receives ambient air through a front grill from movement of the vehicle. During vehicle start-up, when the engine is below its optimal operating temperature, the fan is operated in a reverse direction at variable speeds depending on the speed of the vehicle, so that the airflow through the grill that may otherwise convectively cool the engine is significantly reduced or eliminated.

19 Claims, 1 Drawing Sheet

REVERSE FAN OPERATION FOR VEHICLE COOLING SYSTEM

BACKGROUND OF THE INVENTION

1. Field of the Invention

This invention relates generally to a system and method for allowing a vehicle engine to more quickly obtain its operating temperature at vehicle start-up and, more particularly, to a system and method for allowing a fuel cell engine for a vehicle to more quickly obtain its operating temperature at vehicle start-up by operating a fan in a reverse direction to limit the airflow into the engine compartment.

2. Discussion of the Related Art

Hydrogen is a very attractive fuel because it is clean and can be used to efficiently produce electricity in a fuel cell. A hydrogen fuel cell is an electro-chemical device that includes an anode side and a cathode side with an electrolyte therebetween. For automotive applications, a series of fuel cells are combined in a fuel cell stack to generate the desired output power. The fuel cell stack includes a system of flow channels for directing the hydrogen input gas to the anode side of each fuel cell and air to the cathode side of each fuel cell. Further, flow channels are provided for a cooling fluid that flows through the fuel cell stack to maintain a thermal equilibrium.

It is necessary that a fuel cell operate at an optimum relative humidity and temperature to provide efficient stack operation and durability. A typical stack operating temperature for automotive applications is between 60°–80° C. The stack temperature provides the relative humidity within the fuel cells in the stack for a particular stack pressure. Excessive stack temperatures above the optimum temperature may damage fuel cell components, reducing the lifetime of the fuel cells. Also, stack temperatures below the optimum temperature reduces the stack performance. Therefore, fuel cell systems employ thermal sub-systems that control the temperature within the fuel cell stack.

A typical thermal sub-system for an automotive fuel cell stack includes a radiator, a fan and a pump. The pump pumps the cooling fluid through the cooling channels within the fuel cell stack where the cooling fluid collects the stack waste heat. The cooling fluid is directed from the stack to the radiator where it is cooled by ambient air either forced through the radiator from movement of the vehicle or by operation of the fan. Because of the high demand of radiator airflow in order to reject a large amount of waste heat on a relatively low temperature level, the fan is usually powerful and the radiator is relatively large.

At vehicle start-up, the fuel cell stack is typically well below its optimum operating temperature, especially in low temperature environments. It is desirable to raise the temperature of the fuel cell stack to its operating temperature as quickly as possible to increase the stack durability, which could take several minutes. However, the fuel cell stack is still able to produce output power that may be significant enough to operate the vehicle. If the vehicle operator does operate the vehicle prior to the fuel cell stack reaching its optimum temperature, ambient air is undesirably forced through the radiator into the engine compartment from the motion of the vehicle, which acts to convectively cool the fuel cell engine. This convective cooling increases the time that the fuel cell stack will reach its operating temperature, thus affecting the stack durability and lifetime.

Various techniques have been proposed in the art for reducing the airflow to the engine compartment of a vehicle so that the engine will more quickly reach and maintain its optimum operating temperature. In one known technique for an internal combustion engine, the vehicle operator was required to attach a plastic cover to the front grill of the vehicle in a low temperature environment to reduce the airflow to the engine. Such a solution in today's market would not be acceptable. It is further known to employ louvered panels adjacent to the front grill of the vehicle, where the panels are opened or closed automatically depending on the external temperature and the operating condition of the vehicle. However, the louvered panels have several disadvantages, including high cost, additional weight, additional packaging space, and icing that may prevent the panels from opening in winter conditions.

It is further known in the art to operate a fuel cell stack or a combustion engine inefficiently during vehicle start-up to increase the waste heat produced by the stack or the combustion engine. However, this solution had the disadvantage that it increases fuel consumption. It is also possible to provide thermal insulation around the fuel cell engine to decrease the convective cooling. However, this solution required packaging space, additional cost and reduced thermal losses at hot ambient temperatures and high system loads when heat dissipation is necessary to reduce the thermal load of the radiator.

SUMMARY OF THE INVENTION

In accordance with the teachings of the present invention, a system and method are disclosed for reducing the time that it takes a vehicle engine to reach its operating temperature at vehicle start-up. The system and method of the invention have particular application for a fuel cell engine. The system includes a radiator and a fan, where a cooling fluid from the engine is directed through the radiator where it is cooled by airflow from the fan during high load conditions. The radiator also receives ambient air through a front grill from movement of the vehicle. A controller controls the speed of the fan depending on the temperature of the cooling fluid and the load on the engine. During vehicle start-up, when the engine is below its optimal operating temperature, the controller operates the fan in a reverse direction at variable speeds depending on the speed of the vehicle, so that the inlet airflow through the radiator that may otherwise convectively cool the engine is significantly reduced or eliminated.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a technique for reducing convection cooling of a vehicle engine during engine start-up is merely exemplary in nature, and is in no way intended to limit the invention or its applications or uses. For example, the thermal sub-system discussed below has particular application for a fuel cell engine. However, as will be appreciated by those skilled in the art, the technique also has application for internal combustion engines, as well as other types of engines.

Figure 1:
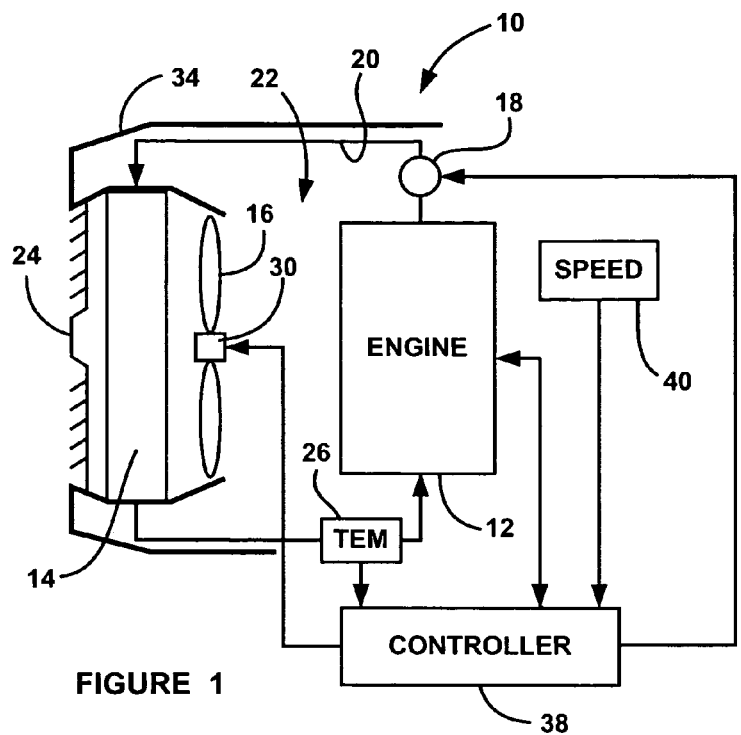
FIG. 1 is a side view of an engine system employing a fan that is operated in a reverse direction during engine start-up, according to an embodiment of the present invention.

FIG. 1 is a side view of a vehicle engine system 10 including an engine 12 positioned within an engine compartment 22. The engine 12 is intended to represent a fuel cell engine including a fuel cell stack, an internal combustion engine, or any other type of engine that is cooled. The engine system 10 also includes a radiator 14, a variable speed fan 16 and a pump 18. The pump 18 pumps a cooling fluid, such as water, through cooling channels (not shown) in the engine 12 and through an external pipe 20. The cooling fluid pumped through the pipe 20 is directed through the radiator 14 where it is cooled. A temperature sensor 26 positioned within the pipe 20 measures the temperature of the cooling fluid exiting the radiator 14, and provides a signal indicative of the temperature of the cooling fluid entering the engine 12. A motor 30 operates the fan 16 at variable RPMs.

When the vehicle is moving, ambient air is forced through a front grill 24 and the radiator 14 to cool the cooling fluid in the radiator 14. If the ambient air forced through the front grill 24 is not enough to cool the cooling fluid, then the variable speed fan 16 is also used to draw air through the front grill 24 and the radiator 14 to further cool the cooling fluid. The air drawn into the engine compartment 22 also operates to cool the engine 12 by convective cooling. The engine system 10 includes a shroud 34 positioned around the radiator 14 and the fan 16, as shown, to direct the air from the front grill 24 through the radiator 14. The additional cooling from the fan 16 may be required at low vehicle speeds and/or high load demands from the engine 12.

The engine 12 can be a fuel cell engine having an optimal operating temperature in the 60°–80° C. range. In order to maintain the engine 12 at this temperature during high ambient temperatures and/or high load demands, such as going uphill, the fan 16 must be relatively powerful, possibly up 2 kW, and the radiator 14 typically needs to be relatively large. Further, the fan 16 should be a variable speed fan in that it can be run at any speed. To provide this fan operation, the electric motor 30 typically needs to be an electronically controlled brushless motor, however, other electric motors may also be applicable.

The engine system 10 is controlled by a controller 38. The controller 38 receives operating signals from the engine 12, the temperature signal from the temperature sensor 26 and a vehicle speed signal from a vehicle speed sensor 40. The controller 38 controls the electric motor 30 to control the speed of the fan 16 and the operation of the pump 18, as well as providing other system controls.

According to the invention, the controller 38 controls the electric motor 30 to rotate the fan 16 in either direction. In the normal operating mode, the fan 16 is rotated in a forward direction so that ambient air is pulled through the front grill 24 and the radiator 14 into the engine compartment 22 to cool the cooling fluid within the radiator 14. During vehicle start-up when the engine 12 is typically below its optimal operating temperature, air entering the front grill 24 into the engine compartment 22 convectively cools the engine 12, decreasing the time it takes the engine 12 to reach its optimal operating temperature. If the vehicle is traveling at a relatively fast speed (and low load), this time limit can be significant. For his situation, the controller 38 rotates the fan 16 in the reverse direction to significantly reduce or eliminate the air entering the engine compartment 22 through the front grill 24. The shroud 34 directs the air so that the fan 16 is able to more effectively prevent air from entering the engine compartment 22. The speed of the fan 16 is determined by the controller 38 from the speed of the vehicle provided by the speed sensor 40. Once the temperature of the engine 12 from the temperature sensor 26 reaches the optimal temperature, then the controller 38 will return to its normal operating mode where the fan 16 will be operated in the forward direction when necessary.

Figure 2:
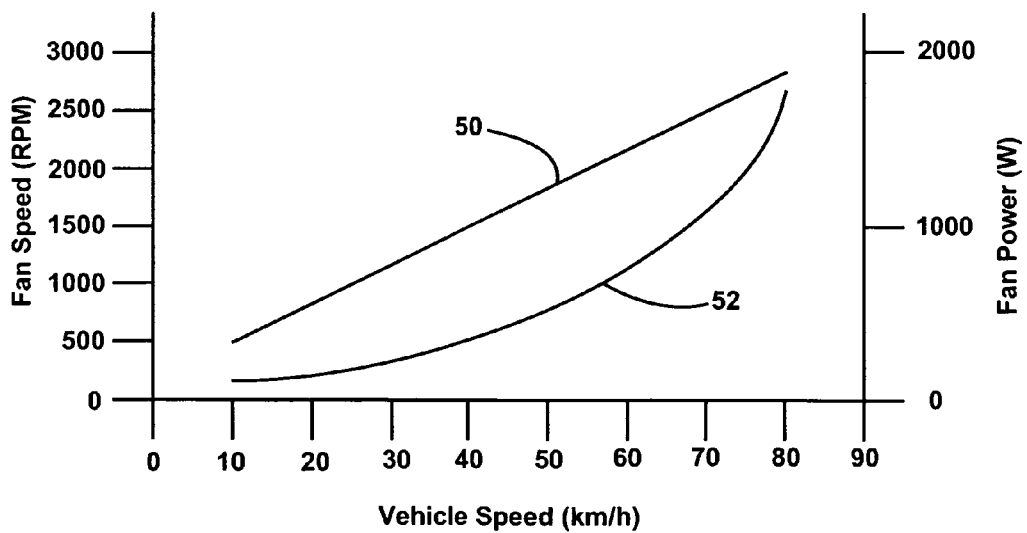
FIG. 2 is a graph with vehicle speed on the horizontal axis and fan speed and fan power on the vertical axis showing the relationship between the vehicle speed and the fan speed to reduce convective cooling of the engine shown in FIG. 1.

As mentioned above, the speed of the fan 16 in the reverse direction is determined by the speed of the vehicle. FIG. 2 is a graph with vehicle speed on the horizontal axis, fan speed on the left vertical axis and fan power on the right vertical axis. Graph line 50 shows the relationship between the vehicle speed and the fan speed, and is almost a linear relationship. Graph line 52 shows the relationship between the vehicle speed and the fan power. It has been observed that airflow into the engine compartment 22 through the front grill 24 can virtually be stopped at vehicle speeds up to 80 km/h using an 1800W electric fan power. In an alternate embodiment to stop the airflow into the engine compartment 22 up to 40 km/h, a 200W fan can be used.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An engine system comprising:
   an engine compartment;
   an engine positioned within the engine compartment, said engine having an optimal operating temperature;
   a thermal sub-system including a radiator and a fan, said thermal sub-system directing a cooling fluid through the engine and the radiator, said fan being positioned in or proximate to the engine compartment; and
   a controller, said controller controlling the speed of the fan in a forward direction to draw ambient air through the radiator and into the engine compartment to flow around the engine when the temperature of the engine is at or near the optimal operating temperature, and said controller controlling the speed of the fan in a reverse direction to prevent air from entering the engine compartment and flowing around the engine when the temperature of the engine is below the operating temperature.

2. The engine system according to claim 1 further comprising a motor for rotating the fan.

3. The engine system according to claim 2 wherein the electric motor is an electrically controlled brushless motor.

4. The engine system according to claim 1 wherein the fan is a continuously variable speed fan.

5. The engine system according to claim 1 further comprising an engine compartment shroud, said engine compartment shroud being positioned relative to the radiator and the fan so as to control the direction of the air entering the engine compartment.

6. The engine system according to claim 1 wherein the controller controls the speed of the fan in the reverse direction based on the speed of the vehicle.

7. The engine system according to claim 1 wherein the engine is a fuel cell engine.

8. The engine system according to claim 1 wherein the engine is an internal combustion engine.

9. A fuel cell engine, said engine having an optimal operating temperature, said engine comprising:
   an engine compartment;
   a thermal sub-system including a radiator and a fan, said thermal sub-system directing a cooling fluid through the engine and the radiator, said fan being positioned in or proximate to the engine compartment; and a controller, said controller controlling the speed of the fan in a forward direction to draw ambient air through the radiator and into the engine compartment to flow around the engine when the temperature of the engine is at or near the optimal operating temperature, and said controller controlling the speed of the fan in a reverse direction based on the speed of the vehicle to prevent air from entering the engine compartment and flowing around the engine when the temperature of the engine is below the operating temperature.

10. The engine system according to claim 9 further comprising a motor for rotating the fan.

11. The engine system according to claim 10 wherein the electric motor is an electrically controlled brushless motor.

12. The engine system according to claim 9 wherein the fan is a continuously variable speed fan.

13. The engine system according to claim 9 further comprising an engine compartment shroud, said engine compartment shroud being positioned relative to the radiator and the fan so as to control the direction of the air entering the engine compartment.

14. A method for allowing a vehicle engine to more quickly obtain its operating temperature at vehicle start-up, said method comprising:

directing a cooling fluid through the engine and a radiator;

operating a fan in a forward direction to direct air through the radiator and into an engine compartment to flow around the engine to maintain the engine at the operating temperature; and operating the fan in a reverse direction when the engine is below the operating temperature to prevent air from entering the engine compartment and flowing around the engine.

15. The method according to claim 14 wherein operating the fan in a reverse direction includes operating the fan in a reverse direction at variable speeds depending on the speed of the vehicle.

16. The method according to claim 14 wherein operating the fan in a reverse direction includes operating fan with an electrically controlled brushless motor.

17. The method according to claim 14 further comprising providing an engine compartment shroud positioned relative to the radiator and the fan so as to control the direction of the air entering the engine compartment.

18. The method according to claim 14 wherein the engine is a fuel cell engine.

19. The method according to claim 14 wherein the engine is an internal combustion engine.

* * * * *